(12) United States Patent
Spruit et al.

(10) Patent No.: US 6,243,339 B1
(45) Date of Patent: Jun. 5, 2001

(54) METHOD AND DEVICE FOR WRITING OPTICAL RECORD CARRIERS

(75) Inventors: Johannes H. M. Spruit; Jeroen J. L. Horikx, both of Eindhoven (NL); Johan P. W. B. Duchateau, Hasselt (BE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/203,698

(22) Filed: Dec. 2, 1998

(30) Foreign Application Priority Data

Aug. 12, 1997 (EP) .................................................. 97203846

(51) Int. Cl.⁷ ...................................................... G11B 3/90
(52) U.S. Cl. .................................. 369/53.13; 369/47.17; 369/47.55; 369/53.37; 369/59.11
(58) Field of Search ............................. 369/44.32, 44.33, 369/47.14, 47.17, 47.18, 47.55, 53.12, 53.14, 53.15, 53.18, 53.19, 53.32, 53.33, 53.37, 53.42, 53.45, 59.11, 59.23, 116

(56) References Cited

U.S. PATENT DOCUMENTS 5,402,785    4/1995   Leigh et al. .

FOREIGN PATENT DOCUMENTS

0669611A1    9/1952   (EP) .
WO9301509    1/1993   (WO) .

*Primary Examiner*—Paul W. Huber
(74) *Attorney, Agent, or Firm*—Michael E. Blek

(57) ABSTRACT

A method is described for optimizing recording conditions for writing information on an optical record carrier. The information is written on the record carrier in the form of optically detectable marks, each mark being written by a pulse series of radiation. A series of test patterns is written on the record carrier (1) for the optimization. A jitter detector (11) measures both the leading-edge and trailing-edge jitter of the read signal. The leading-edge jitter is used to optimize the value of a parameter influencing only the leading part of a pulse series. The trailing-edge jitter is used to optimize a parameter influencing only the trailing part of the pulse series.

12 Claims, 3 Drawing Sheets

METHOD AND DEVICE FOR WRITING OPTICAL RECORD CARRIERS

Figure 1:
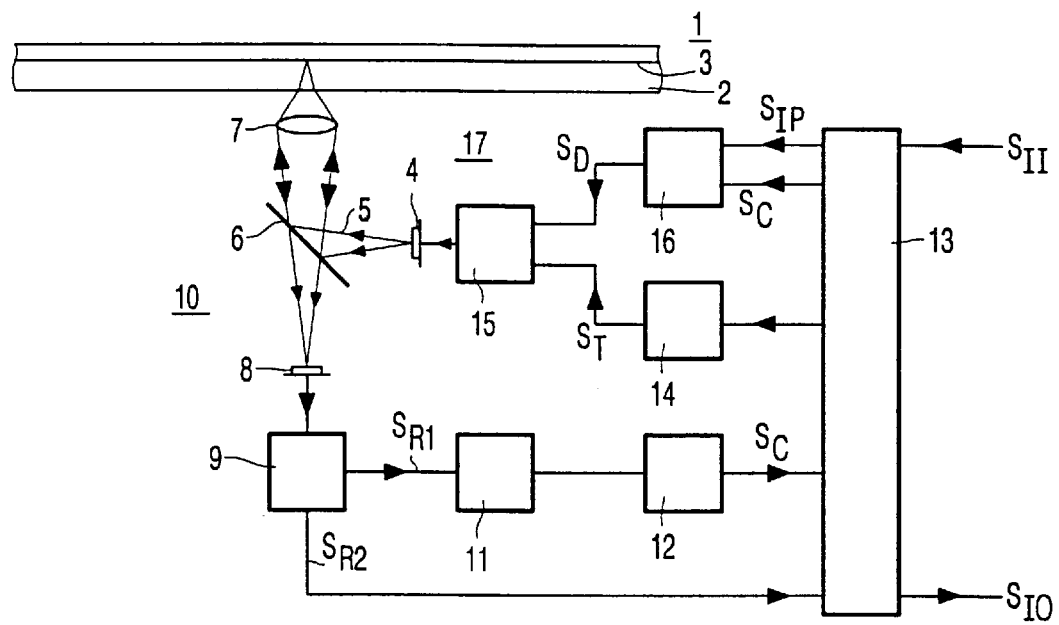

The invention relates to a method and an device for writing user information on an optical record carrier. Marks representing the user information are written in a radiation-sensitive recording layer of the record carrier by means of pulses series of radiation. A pulse series comprises one or more pulses. Before recording user information on a record carrier, a test pattern is written onto the record carrier. The read signal obtained from this pattern provides information for optimizing the recording process, in particular the form of the pulse series. The user information is subsequently written onto the record carrier with the optimized process.

European patent no. 0 669 611 discloses such a method and device for optimizing the write power of the pulse series. The known device writes a test pattern on the record carrier, the test pattern consisting of a series of sub-patterns, each sub-pattern being written with a different radiation power. Subsequently, the jitter of the read signal corresponding to each sub-pattern is measured. The recording power is set at the value where the jitter versus power curve shows a minimum jitter. The jitter of a data signal is a measure for the deviation between the position of falling and/or rising edges of the data signal and corresponding transitions of a clock signal, possibly recovered from the edges of the data signal. The deviation may be normalized on the duration of one period of the clock signal.

However, the known method does not always provide optimum recording conditions, in particular when record carriers and devices of different manufacturers are interchanged.

It is an object of the invention to provide a recording device and method with an improved adaptation of the recording conditions to the combination of a particular device and record carrier.

This object is achieved when the device according to the invention comprises recording means for writing a pattern of optically readable marks on the record carrier by irradiating the record carrier with pulse series of radiation, a mark being formed by one pulse series, a test signal generator for generating a test signal comprising a test pattern and supplying the test signal to an input of the recording means, reading means for reading marks on the record carrier and supplying a read signal, a jitter detector for measuring jitter of the read signal corresponding to the test pattern and supplying a leading-edge jitter signal and a trailing-edge jitter signal, control means for supplying a first control signal and a second control signal in dependence on the leading- and trailing-edge jitter signal respectively, the values of the control signals corresponding to an optimum quality of the read signal, processing means for converting input information to be recorded into an output signal supplied to the recording means, the output signal corresponding to pulse series of radiation and representing the input information, each pulse series having a leading part and a trailing part, an optimum value of a first parameter relating to the leading part being determined by the first control signal and/or an optimum value of a second parameter relating to the trailing part being determined by the second control signal.

It has turned out that the known device is not always able to find optimum recording conditions because it uses the total jitter, i.e. the combined jitter of both the leading and trailing edges of the read signal. When the leading- and trailing-edge jitter are determined separately, it is possible to improve further the recording conditions. Since the leading-edge jitter is a measure of the accuracy of the leading edge position of a written mark in the recording layer, the measured leading-edge jitter is preferably used to influence this position. The position of the leading edge of a mark may be influenced by varying a first parameter of the leading part of the pulse series used for writing the mark. Likewise, the trailing-edge jitter is a measure of the accuracy of the trailing edge position of a written mark, and the trailing-edge jitter is preferably used for optimizing a second parameter of the trailing part of the pulse series. The recording conditions are said to be optimum if the number of errors in the recovery of the information recorded under these conditions is minimal.

In general information is represented on the record carrier by a set of different marks. If, for instance, the information is coded according to the so-called EFM, the set will comprise marks having lengths of 3, 4, . . . 11 times a unit length and possibly a synchronization mark of 14 unit lengths. An mark having a length of n times the unit length is called an nT mark. A single mark out of the set of different marks is written by a pulse series of a corresponding set of different pulse series. The length of a pulse series increases with increasing length of the mark to be written. In the optimization method according to the invention the leading part of at least one pulse series of the set of pulse series is optimized; likewise, the trailing part of at least one pulse series of the set is optimized. Both the leading and trailing part of a pulse series may be optimized according to the invention.

Preferably, the leading part of short pulse series is optimized, whereas the trailing part of long pulse series is optimized. The leading part and trailing part of pulse series of intermediate length may be optimized. The caesura between short and long pulses should be closer to the shortest than to the longest pulse series, because the relative change in length of written marks of increasing length is larger for shorter marks than for longer marks. The caesura for the EFM-coded information is preferably at the T4 or T5 pulse series. The separate optimization of pulse series of different lengths provides a very suitable method to improve the recording conditions.

The first or second parameter to be optimized may be the radiation power of the leading or trailing part of the pulse series, respectively. A pulse series may comprise one or more radiation pulses. When a pulse series has two or more pulses, the first or second parameter may be the pulse widths of a pulse in the leading or trailing part of the pulse series, respectively. Alternatively, the first or second parameter may be a time duration between two pulses in the leading or trailing part of a pulse series. A combination of different parameters for the leading and trailing part is also possible, e.g. the radiation power of the leading part and a pulse width of the trailing part. In a preferred embodiment of the device the first parameter is the power of the leading part and the second parameter is the power of a trailing pulse of a pulse series.

The device according to the invention preferably sets the power of the pulse series at an optimum value in dependence on a measured amplitude or total jitter of the read signal corresponding to a recorded test pattern. The power applies to those parts of the pulse series where the power is not affected by the first or second parameter. The measured amplitude may be converted to a modulation or a so-called asymmetry of the read signal in order to set the power.

The parameter to be optimized first in the method according to the invention should be the parameter which most strongly affects the other parameters. A preferred order for determining the optimum recording conditions is to write first a test pattern with varying values of the first parameter, e.g. the power of only the leading part of pulse series. The optimum value of the first parameter is determined from this pattern by measuring the leading-edge jitter of the read signal and determining the value of the first parameter corresponding to the minimum jitter. A second test pattern is recorded using the optimum power and the optimum value of the first parameter and varying the value of a second parameter, e.g. the power of the trailing pulse of a pulse series. The optimum value of the second parameter is determined from the trailing-edge jitter of the read signal.

The above two optimization steps are preferably preceded by a step to optimize the write power of those parts of the pulses series which are not affected by the above two steps. Thereto a test pattern with varying values of the write power of the pulse series is written on the record carrier and an optimum write power is determined from the read signal corresponding to that pattern. This write power may be used when writing the first and second test pattern. After the above two steps a fourth test pattern may be recorded using the optimum values of the first and the second parameter and varying the power of the pulse series over a small range around the optimum value found in the first step. The optimum value of the power is determined from the amplitude of the read signal.

A further aspect of the invention relates to a method of recording information on an optical record carrier, comprising the steps for determining the optimum recording conditions as described for the recording device according to the invention.

A further aspect of the invention relates to a method of recording information on a record carrier in the form of marks of different lengths, a mark being formed by irradiating the record carrier with a pulse series of radiation, each pulse series having a leading part, a middle part and a trailing part, each pulse series belonging to a set of pulse series having different lengths, the set of pulse series comprising a subset of short pulse series and a subset of long pulse series, characterized in that the pulse series of only one of the subsets have a leading part and a middle part which differ in a first parameter, and in that the pulse series of the other one of the subsets have a middle part and a trailing part which differ in a second parameter. The two subsets may partly overlap, i.e. one or more pulse series belong to both subsets. The two subsets may also be disjunct, and not all pulse series need be comprised in the two subsets. A subset comprises at least one pulse series, but preferably two or more.

A further aspect of the invention relates to a method of recording information on a record carrier in the form of marks of different lengths, a mark being formed by irradiating the record carrier with a pulse series of radiation, each pulse series having a leading part and a trailing part, each pulse series belonging to a set of pulse series having different lengths, the set of pulse series comprising a first subset of short pulse series and a second subset of long pulse series, characterized in that the pulse series of the first subset have a first value of a first parameter in the leading part and the pulse series of the second subset have a second, different value of the first parameter in the leading part, and in that the pulse series of the first subset have a first value of a second parameter in the trailing part and the pulse series of the second subset have a second, different value of the second parameter in the trailing part.

The recording method according to the invention has been shown to improve the quality of the recordings and reduce significantly the jitter of the read signal of the recorded information. The influence of the brand of the record carrier and the recording device on the quality of the recording is reduced. In particular, the quality of the recording is less sensitive to the wavelength of the radiation and the filling of the objective lens of the recording device.

Figure 2:
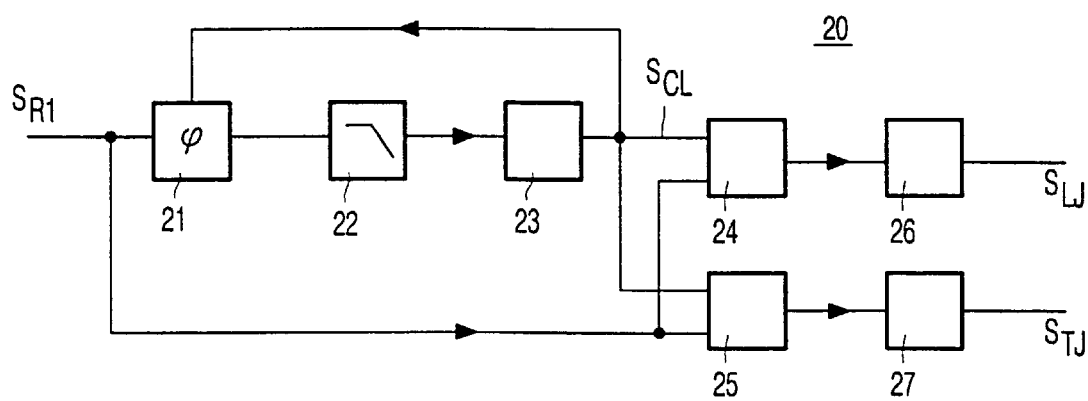
Figure 3:
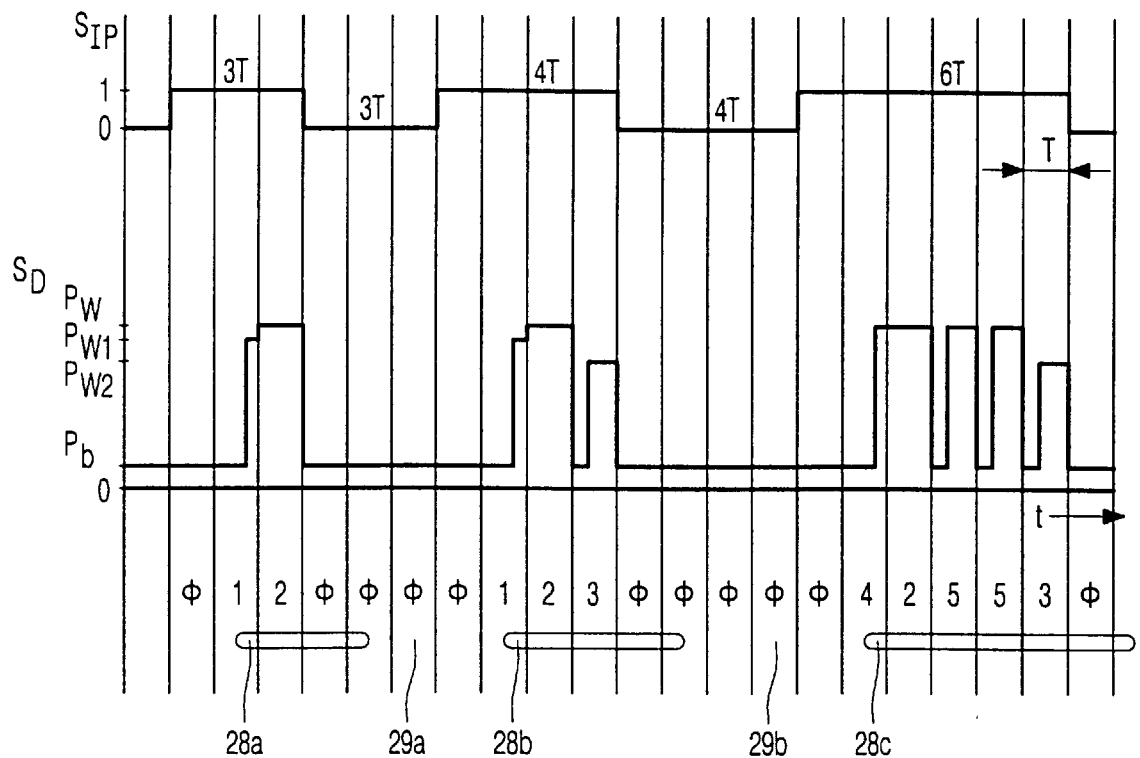
Figure 4:
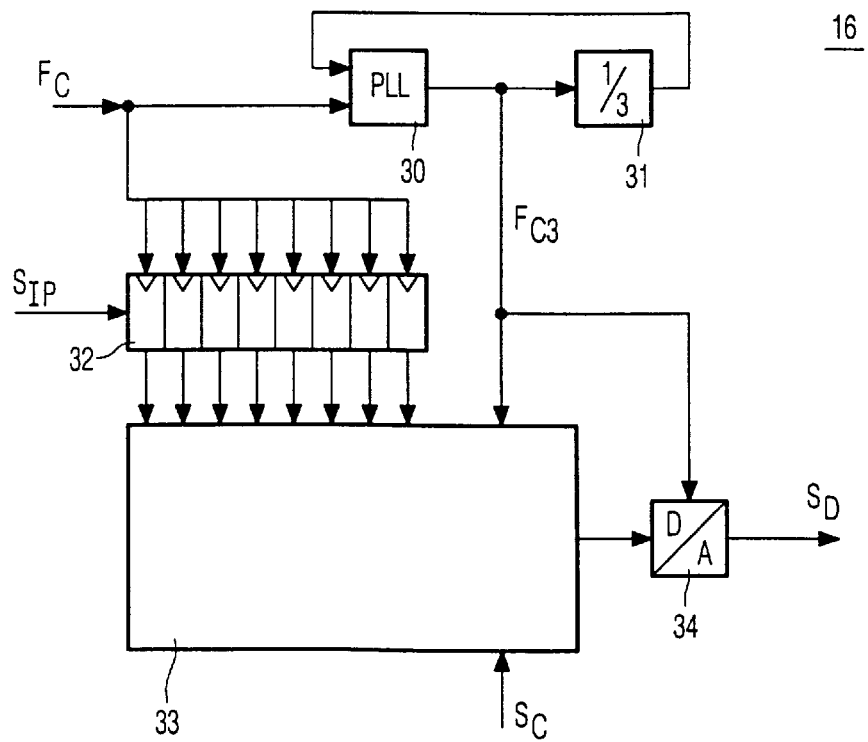
Figure 5A:
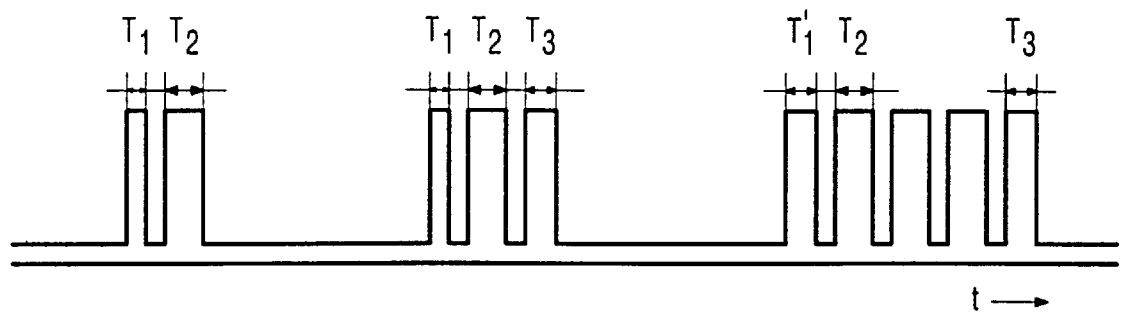

The objects, advantages and features of the invention will be apparent from the following more particular description of preferred embodiments of the invention, as illustrated in the accompanying drawings, in which FIG. 1 is a diagram of an optical recording device according to the invention, FIG. 2 is a diagram of a jitter detector, FIG. 3 shows a digital information signal, a signal corresponding to the radiation power for writing and a corresponding sequence of states, FIG. 4 is a diagram of information processing means, and FIGS. 5A and B show two signals corresponding to the radiation power for writing.

FIG. 1 shows a device and an optical record carrier 1 according to the invention. Record carrier 1 has a transparent substrate 2 and a recording layer 3 arranged on it. The recording layer comprises a material suitable for writing information by means of a radiation beam. The recording layer may be of e.g. the magneto optical type, the phase-change type, the dye type or of any other suitable material. The invention is applicable to any of these media, but has been shown to be particularly suitable for dye media. Information may be recorded in the form of optically detectable regions, also called marks, on recording layer 3. The device comprises a radiation source 4, e.g. a semiconductor laser, for emitting a radiation beam 5. The radiation beam is converged on recording layer 3 via a beam splitter 6, an objective lens 7 and substrate 2. The record carrier may also be air-incident, where the radiation beam is incident directly on recording layer 3 without passing through a substrate. Radiation reflected from medium 1 is converged by objective lens 7 and, after passing through beam splitter 6, falls on a detection system 8, which converts the incident radiation in electric detector signals. The detector signals are input to a circuit 9. The circuit derives several signals from the detector signals, such as a read signal $S_{R1}$ representing the information being read from medium 1. Radiation source, beam splitter 6, objective lens 7, detection system 8 and circuit 9 together form reading means 10. In an alternative embodiment beam splitter 6 is a diffraction grating, and detection system 8 is arranged close to radiation source 4.

Read signal $S_{R1}$ from circuit 9 is processed in a first processor 11 in order to derive signals representing one or more read parameters, e.g. a modulation, asymmetry or jitter, from the read signal. The signals are used for controlling the recording process. The signals are fed in control means 12, which process a series of values of the read parameters and based thereon derives values of control signals $S_C$ corresponding to optimum recording conditions. The control signals are supplied to main processing means 13, e.g. a micro-processor. Processor 11 and control means 12 may be circuits suitable for processing analog signals or circuits suitable for processing digital signals. A second read signal $S_{R2}$, which may be the same signal as $S_{R1}$, supplied by circuit 9 is also fed into main processing means 13, which processes the signal to form an information output signal $S_{IO}$ representing the information read from record carrier 1.

Main processing means 13 control a test signal generator 14, which supplies a test signal $S_T$ to a radiation source driver 15 during a test phase preceding recording of information. Radiation source driver 15 generates the driving signal for radiation source 4 in dependence on the signal at its input. The test signal corresponds to a pulse pattern of the radiation emitted by radiation source 4. Source driver 15, radiation source 4, beam splitter 6, and objective lens 7 together form recording means 17.

An information input signal $S_{II}$, representing the user information to be recorded on record carrier 1, is also fed into main processing means 13. Processing means 13 may add synchronization, address, and error correction information to the user information. The processed information represented by a signal $S_{IP}$ is supplied to processing means 16. Control signals $S_C$ are also supplied to processing means 16. Processing means 16 generate a signal $S_D$ to control radiation source driver 15 when recording information. It uses the control signals for adjusting the driving signal for an optimum recording process.

The radiation pulses emitted by radiation source 4 induce marks in the form of optically detectable changes in recording layer 3. Such a mark may be written by a single radiation pulse. A mark may also be written by a series of radiation pulses of equal or different lengths.

The actual radiation power emitted by radiation source 4 may be measured by a not-shown power detector arranged in an otherwise not-used side lobe of the radiation beam or in radiation reflected off an element in the optical path of the radiation beam. The signal of the power detector may be connected directly to main processing means 13.

First processor 11 comprises means for deriving a read parameter from the read signal. The read parameter may be a parameter related to the amplitude of the read signal, such as modulation or a combination of the modulation of high- and low-frequency components in the read signal. The read parameter may also be a parameter related to the timing of transitions in the read signal, such as jitter. Processor 11 may comprise means for deriving more than one parameter from the read signal.

According to the invention processor 11 comprises a jitter detector 20 for measuring both the leading- and trailing-edge jitter of the read signal $S_{R1}$. FIG. 2 shows an embodiment of the jitter detector 20. Read signal $S_{R1}$ is supplied to a phase detector 21, which measures the phase between the read signal and a clock signal $S_{CL}$. A low-pass filter 22 removes the high-frequency components from the measured phase. The output of low-pass filter 22 is used to control the frequency of a clock generator 23. The clock generator provides the clock signal $S_{CL}$, which is fed back to phase detector 21. The components 21, 22 and 23 form a phase-locked loop, deriving a clock signal from the read signal. Clock signal $S_{CL}$ and read signal $S_{R1}$ are supplied to a first time-interval detector 24, which measures the time intervals between leading edges of the read signal and the closest transitions of the clock signal. The leading edge is that part of the read signal $S_{R1}$ that corresponds to the first part of a mark detected by the scanning radiation beam, whereas the trailing edge is that part corresponding to the last part of mark. Clock signal $S_{CL}$ and read signal $S_{R1}$ are also supplied to a second time-interval detector 25, which measures the time intervals between trailing edges of the read signal and the closest transitions of the clock signal. The measured time intervals of time-interval detectors 24 and 15 are analyzed in circuits 26 and 27, respectively. Circuits 26 and 27 process the time-interval values to form an average value, a standard deviation and/or a peak deviation. In the embodiment of the jitter detector according to the invention the circuits 26 and 27 generate signals $S_{LJ}$ and $S_{TJ}$ representing the standard deviation of the leading-edge jitter and the trailing-edge jitter, respectively.

Processing means 16 generate an output signal $S_D$ in response to information signal $S_{IP}$ and supplies it to radiation source driver 15. FIG. 3 shows in the upper trace part of a two valued, EFM-coded information signal $S_{IP}$ as a function of time t. The signal shows a 3T, 4T and 6T pulse as a sequence of logical values '0' and '1', with transitions between the values occurring at clock moments at a distance T. The second trace in FIG. 3 shows an example of three pulse series of output signal $S_D$ pertaining to the three signal pulses shown in the first trace and optimized according to the invention. The second trace indicates the radiation power of source 4 corresponding to the signal value of $S_D$. $P_b$ is a bias power level insufficient to write a mark in the recording layer. $P_w$ is a write power level of the middle part of the pulse series. $P_{w1}$ is a write power level of the leading part of a pulse series. $P_{w2}$ is a power of the trailing part of a pulse series. The third trace shows logical states for each clock period of duration T. In the example of $S_D$ shown in the second trace the signal values may change at clock moments at a distance of T/3. The first pulse of a pulse series has a width of 4/3 T, subsequent pulses in the pulse series have a width of 2/3 T and a gap between pulses of 1/3 T. The leading part of a pulse series in this example has a length of 1/3 T, the trailing part has a length of 2/3 T. The middle part of a pulse series has a length equal to the total length of the pulse series minus 1T. The fourth trace in FIG. 3 shows schematically the marks formed by the pulse series of the second trace: a 3T, 4T and 6T mark 28a, 28b and 28c respectively and intermediate, unwritten areas 29a and 29b, 3T and 4T length respectively.

In the example of the optimized signal in the second trace of FIG. 3 the power $P_{w1}$ in the leading part of the subset of the shorter pulse series (3T and 4T) is optimized using the leading-edge jitter, whereas the power in the leading part of the longer pulse series (nT with n≧5) is set at the level $P_w$. The power of the trailing part of the 3T pulse series is not optimized and set at the level $P_w$, whereas the power $P_{w2}$ of the trailing part of the subset of longer pulse series (nT with n≧4) is optimized using the trailing-edge jitter.

It will be clear that the invention is not limited to the above lengths of the leading and trailing part of the pulse series, and that different lengths of the leading and trailing parts of the pulse series are possible. Likewise, it will be clear that the invention is not limited to the particular selection shown of pulse series of which the leading and trailing parts are optimized.

FIG. 4 shows an embodiment of processing means 16 that generates the output signal $S_D$ shown in the second trace of FIG. 3 in response to the information signal $S_{IP}$ shown in the first trace of FIG. 3. A clock signal $F_C$ having a period of T is supplied to a phase-locked loop 30. The frequency of output $F_{C3}$ of the phase-locked loop is divided by a factor of three by a divider 31 and subsequently fed back to phase-locked loop 30. The combination of phase-locked loop 30 and divider 31 operates as a frequency triplicator, generating a clock signal $F_{C3}$ having a period of 1/3 T. Information signal $S_{IP}$ is supplied to an eight-bit shift register 32. The input bits of $S_{IP}$ are fed into the register at a rate of one bit per clock period T. The contents of the register are supplied to a state machine 33 once each clock period T. The state machine converts each eight-bit word from the register into three consecutive power values. The power values are delivered at an output of the state machine at a rate of one value per 1/3 T period. Hence, three power values are provided per clock period T. The power values are converted from digital to analog format by a D-A convertor 34, which supplies an analog output signal $S_D$, to be used in source driver 15.

The operation of the state machine will be explained with reference to table I.

TABLE 1

| state | bitpattern | power value |
| --- | --- | --- |
| 0 | xxxx0xxx | $P_b, P_b, P_b$ |
|   | xxx01xxx |   |
| 1 | xx01110x | $P_b, P_b, P_{w1}$ |
|   | xx011110 |   |
| 2 | x0111xxx | $P_w, P_w, P_w$ |
| 3 | x11110xx | $P_b, P_{w2}, P_{w2}$ |
| 4 | xx011111 | $P_b, P_b, P_w$ |
| 5 | 111111xx | $P_b, P_w, P_w$ |

The table shows the bit pattern received by state machine 33 from shift register 32, the corresponding state of the state machine and the three consecutive power values pertaining to that state. The states belonging to information signal $S_{SP}$ in the first trace of FIG. 3 are indicated in the bottom trace of the FIG. 3. There are two input bit patterns that lead to state 0 and two that lead to state 1. The right-most bit of each bit pattern is the last bit of information entered into shift register 32. The fourth bit from the right is the current bit. Each bit in the table can have the logical values '0' and '1' and the so-called 'don't care' value '0' or '1', indicated by an 'x'. As an example, if at a clock instant of $F_C$ state machine 33 has a bit pattern 'x11110xx', it enters into state 3; in response it provides at three consecutive clock moments of $F_{C3}$ the power values $P_b$, $P_{w2}$ and $P_{w2}$, in this order. These digital power values are converted from digital to analog and supplied to source driver 15.

Before writing information on record carrier 1 the device goes through a test phase in which it sets the radiation power of the pulse series used for writing to an optimum value by performing the following procedure. The device writes a first test pattern on record carrier 1, comprising a series of sub-patterns each having a different write power. Subsequent sub-patterns may be written with a step-wise increased write power under the control of main processing means 13. The lengths of the marks in the sub-patterns should be selected so as to give a desired read signal. If the maximum modulation of the read signal is to be determined, the sub-patterns should comprise marks sufficiently long to achieve a maximum modulation of the read signal. When the information is coded according to the so-called EFM modulation, the test patterns preferably comprises the long $I_{11}$ marks. The patterns may be written anywhere on the medium. They may also be written in specially provided test areas on the medium.

Read signal $S_{R1}$ corresponding to the first test pattern is processed by processor 11 and a first read parameter is derived from the read signal. The first read parameter may be the modulation of the read signal. The first read parameter is preferably the asymmetry of the read signal, called β, being a measure for the difference between the average value of the read signal taken over the entire information bandwidth and the average value of the components of the read signal near the low-frequency end of the bandwidth. A signal representing the asymmetry may be obtained by passing read signal $S_{R1}$ through a high-pass filter, determining the signal values A1 and A2 of the upper and lower envelop of the filtered signal, respectively, and calculate β=(A1+A2)/(A1−A2), where, in general, A2 will have a negative value.

Control means 12 receive from processor 11 values of β for all sub-patterns in the first test pattern. The values of β and the write powers of the corresponding sub-patterns form a β versus write power curve, which is a line crossing the β=0 axis. Control means 12 determine the write power for which β has a value close to or equal to zero, preferably in a range from −0.05 to +0.15. The selected optimum write power is supplied to main processing means 13.

In the second step of the test phase the device optimizes the leading part of the pulse series used for writing. To that end, test signal generator 14 generates a test signal for writing a second test pattern on the record carrier, using the optimum write power obtained in the first step. The second test pattern comprises a series of sub-patterns with different values of the power in the leading part of the pulse series. Processor 11 measures the leading-edge jitter $S_{LJ}$ of the read signal corresponding to each sub-pattern and supplies the jitter values to control means 12. Control means 12 uses the leading-edge jitter values of the sub-patterns to determine the leading-edge power $P_{W1}$ that gives the lowest leading-edge jitter. The control signal representing this value is supplied to main processing means 13.

In the third step of the test phase the device optimizes the trailing part of the pulse series used for writing. The device writes a third test pattern using pulse series with write powers for the trailing pulses having different values in the different sub-patterns of the third test pattern. The pulse series apply the optimum leading-edge power obtained in the second step and the optimum power found in the first step. Processor 11 measures the trailing-edge jitter $S_{TJ}$ of the read signal corresponding to each of the sub-patterns. Control means 12 determines the trailing-edge power $P_{W2}$ for which the trailing-edge jitter shows a minimum value and supplies this value as a control signal to main processing means 13. For specific record carriers the trailing part is optimized in the second step and the leading part in the third step.

In the fourth step of the test phase the device optimizes once more the write power using the leading and trailing powers obtained in the second and third step. The device writes a fourth test pattern using pulse series with write powers in the middle part of the pulse series having different values for the different sub-patterns in the fourth test pattern. The write powers lie in a relatively small range around the optimum write power obtained in the first step. Processor 11 and control means 12 form a control signal representing the optimum write power $P_W$ and supply it to main processing means 13.

After the test phase information represented by signal $S_{II}$ may be recorded on the record carrier under optimum recording conditions. The pulse series formed by processing means 16 in dependence on the information signal $S_{II}$ are modified in accordance with control signals $S_C$. In the above embodiment of the device the power of the leading part of the 3T and 4T pulse series is set to the leading-edge power $P_{W1}$ and the power of the trailing part of the nT pulse series with n≧4 is set to the trailing-edge power $P_{W2}$. The power of the middle part of the pulse series is set to the optimum power $P_W$.

In an alternative embodiment of the method according to the invention, $P_{W1}$ of the 3T and 4T pulse series is optimized to the same value in a first step. $P_{W2}$ of the nT pulse series with n≧4 is optimized to the same value in a subsequent step. $PW_2$ of the 4T pulse series is optimized again in a next step.

FIG. 5 shows output signals $S_D$ for a 3T, 4T and 6T mark resulting from alternative embodiments of the recording method according to the invention. An nT mark is written by a series of (N−1) pulses. In the embodiment of FIG. 5A the first parameter is the width $T_1$ of the first pulse of the 3T and 4T pulse series, the value of which is determined in a single optimization step. The width $T_2$ of the pulses between the first and last pulse of each pulse series has a predetermined value, e.g. 2/3 T. The time duration between the pulses in a series also has a predetermined duration, e.g. 1/3 T. The width $T_3$ of the last pulse of the nT pulse series with $n \geq 4$ is determined in a single optimization step. The width $T_1'$ of the first pulse of the nT pulse series with $n \geq 5$ has a predetermined value, e.g. 1/3 T. In a subsequent optimization step the value of $T_3$ of the 4T pulse series may be further optimized.

Figure 5B:
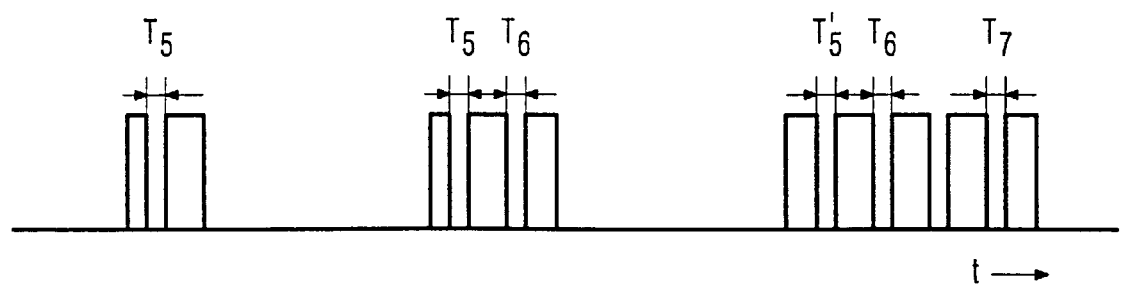

FIG. 5B shows an output signal $S_D$ of a 3T, 4T and 6T pulse series of which the time duration between pulses has been optimized. In the example shown the pulse widths have a constant, predetermined value, e.g. 1/3 T, 2/3 T, 2/3 T, 2/3 T, 1/2 T for the 6T pulse series. In a first optimization step the duration $T_5$ between the first and second pulse of the 3T and 4T pulse series is optimized. The duration $T_6$ between pulses other than the first and last one of a series has a predetermined value, e.g. 1/3 T. Likewise, the duration $T_5'$ between the first and second pulse of nT pulse series with $n \geq 5$ has a predetermined value, e.g. 1/3 T. In a subsequent optimization step the duration $T_7$ between the one but last and last pulse of nT pulse series with $n \geq 4$ is determined.

It will be clear that for specific applications combinations can be made of the methods shown in FIGS. 3, 5A and 5B, e.g. a power optimization of the leading part and a pulse width optimization of the trailing part.

A recording device may record the optimum recording conditions obtained in the above procedure on the record carrier, together with an identification of the device. The recording conditions may include the write powers $P_w$, $P_{w1}$ and $P_{w2}$, write speed and wavelength. The device is then able to check whether or not a record carrier must be tested before recording. If the identification on the record carrier is equal to the identification of the device, the recording test procedure need not be performed and the recording conditions read from the record carrier can be used instead. Alternatively or additionally, a recording device or a record manufacturer may write starting values or ranges for the parameters on the record carrier. The methods of recording according to the invention are suitable for writing in erased recording layers and for writing in not yet erased recording layers, i.e. for the so-called direct-overwrite.

What is claimed is:

1. Device for recording information on an optical record carrier, comprising recording means for writing a pattern of optically readable marks on the record carrier by irradiating the record carrier with pulse series of radiation, a mark being formed by one pulse series, a test signal generator for generating a test signal comprising a test pattern and supplying the test signal to an input of the recording means, reading means for reading marks on the record carrier and supplying a read signal, a jitter detector for measuring jitter of the read signal corresponding to the test pattern and supplying a leading-edge jitter signal and a trailing-edge jitter signal, control means for supplying a first control signal and a second control signal in dependence on the leading- and trailing-edge jitter signal respectively, the values of the control signals corresponding to an optimum quality of the read signal, processing means for converting input information to be recorded into an output signal supplied to the recording means, the output signal corresponding to pulse series of radiation and representing the input information, each pulse series having a leading part and a trailing part, an optimum value of a first parameter relating to the leading part being determined by the first control signal and/or an optimum value of a second parameter relating to the trailing part being determined by the second control signal.

2. Device as claimed in claim 1, wherein the first or second parameter is a radiation power of the leading or trailing part.

3. Device as claimed in claim 1, wherein the first or second parameter is a width of a pulse in the leading or trailing part.

4. Device as claimed in claim 1, wherein the first or second parameter is a time duration between two pulses in the leading or trailing part.

5. Device as claimed in claim 1, wherein the control means is arranged to derive the value of the second control signal from a test pattern recorded with an optimum value of the first parameter.

6. Device as claimed in claim 1, wherein the control means are arranged for supplying a third control signal in dependence on an amplitude of the read signal corresponding to the test pattern and for controlling the radiation power of the pulse series, the value of the third control signal corresponding to an optimum quality of the read signal, and the processing means are arranged for receiving the third control signal and using its value in the conversion of the input information to be recorded into the output signal.

7. Method of recording information on a record carrier, comprising the steps of writing a test pattern of marks on the record carrier, reading the test pattern and forming a read signal, measuring the leading-edge jitter and the trailing edge jitter of the read signal, determining the optimum values of a first and second control signal in dependence on the leading- and trailing-edge jitter respectively, converting user information to be recorded into an output signal and supplying the output signal to the recording means, the output signal corresponding to pulse series of radiation and representing the input information, each pulse series having a leading part and a trailing part, an optimum value of a first parameter relating to the leading part being determined by the first control signal and/or an optimum value of a second parameter relating to the trailing part being determined by the second control signal.

8. Method according to claim 7, comprising the steps of measuring an amplitude of the read signal, determining an optimum value of a third control signal in dependence on the amplitude, controlling a radiation power of the pulse series in dependence on the value of the third control signal.

9. Method according to claim 7, in which an optimization of the first parameter using a first test pattern is followed by optimization of the a second parameter using a second test pattern.

10. Method of recording information on a record carrier in the form of marks of different lengths, a mark being formed by irradiating the record carrier with a pulse series of radiation, each pulse series having a leading part, a middle part and a trailing part, each pulse series belonging to a set of pulse series having different lengths, the set of pulse series comprising a subset of short pulse series and a subset of long pulse series, characterized in that the pulse series of only one of the subsets have a leading part and a middle part which differ in a first parameter, and in that the pulse series of the other one of the subsets have a middle part and a trailing part which differ in a second parameter.

11. Method according to claim 10, wherein the subset of short pulses has a different leading part and middle part and the subset of long pulse series has a different middle part and trailing part.

12. Method of recording information on a record carrier in the form of marks of different lengths, a mark being formed by irradiating the record carrier with a pulse series of radiation, each pulse series having a leading part and a trailing part, each pulse series belonging to a set of pulse series having different lengths, the set of pulse series comprising a first subset of short pulse series and a second subset of long pulse series, characterized in that the pulse series of the first subset have a first value of a first parameter in the leading part and the pulse series of the second subset have a second, different value of the first parameter in the leading part, and in that the pulse series of the first subset have a first value of a second parameter in the trailing part and the pulse series of the second subset have a second, different value of the second parameter in the trailing part.

* * * * *